(No Model.)
J. HEMP.
Nut-Lock.
No. 227,775. Patented May 18, 1880.
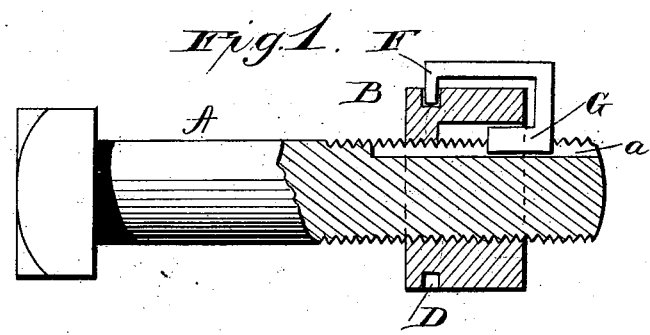
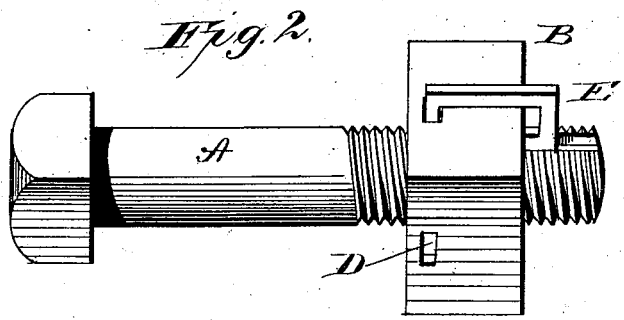
Witnesses:
Inventor:

UNITED STATES PATENT OFFICE.

JAMES HEMP, OF MIDDLEBROOK, VIRGINIA, ASSIGNOR OF ONE-EIGHTH OF HIS RIGHT TO GEO. B. RUSMISELLE, OF SAME PLACE.

NUT-LOCK.

SPECIFICATION forming part of Letters Patent No. 227,775, dated May 18, 1880.

Application filed March 10, 1880. (No model.)

*To all whom it may concern:*

Be it known that I, JAMES HEMP, a citizen of the United States, residing at Middlebrook, in the county of Augusta and State of Virginia, have invented certain new and useful Improvements in Nut and Bolt Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in lock-nuts; and it has for its object to provide for securely fastening a nut on a screw-bolt in any desired position, so that the said nut cannot by any possible means be accidentally shifted.

This object I attain by the mechanism illustrated in the accompanying drawings, in which—

Figure 1 is a partial side elevation and longitudinal section of my device, and Fig. 2 a side elevation of the entire device.

The letter A indicates a screw-bolt of ordinary construction, provided with one or more longitudinal grooves, *a*, at the screw-threaded end.

The letter B indicates a screw-nut adapted to fit and ride upon the screw-threaded end of the screw-bolt. The said nut is provided with the usual parallel outer faces, by which it may be seized by a wrench or key for convenience in applying it to the bolt. In one or all of said faces is formed a recess, D, for the purpose hereinafter explained.

The letter E indicates a removable connection, constructed of elastic or spring metal, having projections F and G, adapted to set into the longitudinal groove or grooves *a* and the recesses D, so as to hold the nut against turning when applied to the bolt.

It will be seen that my device is extremely simple in construction, and consequently very cheap. Moreover, no particular construction of the bolt and nut is required to carry my invention into effect, as a bolt of ordinary construction can be easily grooved longitudinally and its nut provided with the proper recess, by which the bolts to be found in the market can be readily provided with a nut that can be securely fastened thereto at very little expense.

Having described my invention, what I claim, and desire to secure by Letters Patent, is—

The herein-described nut-lock, consisting of the screw-bolt A, having the longitudinal groove *a*, in combination with the screw-nut B, provided with the recesses D, said bolt and nut being locked together by the connecting-piece E, having the key G and pin F, substantially as specified.

In testimony whereof I affix my signature in presence of two witnesses.

JAMES HEMP.

Witnesses:
P. B. HOGSHEAD,
J. FRANK CLEMMER.